United States Patent [19]
Skraba

[11] Patent Number: 4,660,588
[45] Date of Patent: Apr. 28, 1987

[54] METHOD FOR TEMPORARILY STORING FLUIDS

[75] Inventor: Frank W. Skraba, Sweeny, Tex.

[73] Assignee: Phillips Petroleum Company, Bartlesville, Okla.

[21] Appl. No.: 799,709

[22] Filed: Nov. 19, 1985

[51] Int. Cl.[4] .............................................. F16K 11/00
[52] U.S. Cl. ....................................... 137/8; 137/263; 137/334; 137/568; 137/593; 165/7
[58] Field of Search .................. 165/4, 7; 137/263, 8, 137/334, 568, 593

[56] References Cited

U.S. PATENT DOCUMENTS

| | | | |
|---|---|---|---|
| 686,341 | 11/1901 | Rockwood | 137/568 |
| 1,931,791 | 10/1933 | Dueringer | 137/593 X |
| 2,769,455 | 11/1956 | Massey et al. | 137/122 |
| 2,790,307 | 9/1957 | Ayres . | |
| 3,008,484 | 1/1958 | Conan . | |
| 3,027,901 | 4/1962 | Bottenberg et al. | 137/8 |
| 3,380,466 | 3/1968 | Sarra . | |
| 3,504,686 | 4/1970 | Cooper | 137/593 X |
| 3,528,219 | 9/1970 | DeMarco et al. . | |
| 3,543,784 | 12/1970 | Smith . | |
| 3,550,618 | 12/1970 | Roach | 137/568 X |
| 3,556,126 | 1/1971 | Oswald . | |
| 3,653,394 | 4/1972 | McJones . | |
| 4,147,204 | 4/1979 | Pfenninger | 165/4 |
| 4,296,800 | 10/1981 | Johnson . | |

*Primary Examiner*—Robert G. Nilson
*Attorney, Agent, or Firm*—C. F. Steininger

[57] ABSTRACT

A method of temporarily storing a producer unit effluent, during the transmission of the effluent from the producer unit to a user unit at a predetermined user unit flow rate, in which excess producer unit effluent is passed to a storage unit through a single bidirectional flow line and make-up producer unit effluent is passed from the storage unit through the bidirectional flow line to the user unit. The feed rate to the user unit is controlled to maintain a predetermined feed rate and producer unit effluent, from the producer unit to the storage unit and from the storage unit to the user unit through the bidirectional flow line, is controlled by measuring the back pressure built up in the bidirectional flow line or the flow line from the producer unit to the user unit and permitting flow from the bidirectional flow line to the storage unit and from the storage unit to the bidirectional flow line, as the case may be, in accordance with the measured pressure. In a further embodiment, excess producer unit effluent from the producer unit to the storage unit is cooled by passing the same through a heat adsorbent material and make-up producer unit effluent from the storage unit to the user unit is heated by passing the same through the heat adsorbent material. A single bidirectional flow line may also be used in the latter embodiment and the adsorbent material can be disposed in a bidirectional line or a container mounted in a bidirectional flow line.

11 Claims, 2 Drawing Figures

METHOD FOR TEMPORARILY STORING FLUIDS

The present invention relates to a method for temporarily storing fluids. In a more specific aspect the present invention relates to a method for temporarily storing effluent from a first unit process during the transmission of the effluent from the first unit to a second unit process as a feed.

BACKGROUND OF THE INVENTION

In numerous processes, effluent from a producer unit process is utilized as at least one feed component to a user unit process. This is particularly true in the petroleum and chemical industries. When plants including such unit processes are designed, they will normally be designed so that the effluent from the producer unit process will be essentially equal to the feed demands of the user unit process under normal operating conditions. Under these circumstances, it is preferred, in conventional practice, to pass the effluent from the producer unit process directly to the user unit process. However, this is not always possible, since the effluent flow will vary due to upsets in the operation of the producer unit process, normal fluctuations in the volume of effluent produced by the producer unit process, as to maintain proper heat balance, product purity, etc., and fluctuations in the production of effluent due to undesired variations in the feed flow thereto, the character of the feed, etc., while the user unit process requires a constant feed flow thereto for many of the same reasons, such as to maintain heat balance, product purity, etc. It is common practice to compensate for fluctuations in the rate of flow from the producer unit process by transmitting excess effluent from the producer unit process to a temporary storage unit, when the effluent flow rate exceeds the predetermined operating flow rate of feed to the user unit process, and to utilize the thus stored effluent, when the effluent produced is less than the predetermined flow rate to the user unit process. However, numerous problems are associated with the use of such temporary storage facilities. One major problem is that such temporary storage requires a flow line to the temporary storage unit and a flow line from the temporary storage unit. In many cases such flow lines must be constructed of expensive, specialized materials, thus substantially adding to the cost of plant construction and maintenance. In addition, it is necessary in such cases to maintain separate duplicative control systems for each of the two transmission lines, again, adding considerably to the expense of construction and maintenance.

Most importantly, the effluent from the producer unit process will normally be at an elevated temperature, at which temperature it is not possible to store the effluent. Accordingly, when effluent from the producer unit process is to be passed to temporary storage, it is normally cooled to a storage temperature prior to storage. As a result, addition of even small amounts of the thus cooled effluent, to make up deficiencies in the effluent produced by the producer unit process, causes serious upsets in the user unit process and lowers the capacity of the user unit process. It is, therefore, necessary in such cases to reheat the thus cooled effluent from the temporary storage unit prior to its use as a feed to the user unit process. Such cooling and reheating obviously adds to the cost of initial construction and operation of the plant and also results in substantial losses of heat and substantially increased energy requirements for reheating.

SUMMARY OF THE INVENTION

It is, therefore, an object of the present invention to provide an improved method and apparatus to overcome the above-mentioned and other problems of the prior art. Another object of the present invention is to provide an improved method and apparatus for the temporary storage of effluent from a producer unit process, when the output of the producer unit process varies from a predetermined constant volume of feed required by a user unit process. A further object of the present invention is to provide an improved method and apparatus for the temporary storage of effluent from a producer unit process, in which the cost and operating expenses of transmitting effluent to the temporary storage and supplying effluent from the temporary storage to a user unit process is reduced. Another and further object of the present invention is to provide an improved method and apparatus for temporarily storing effluent from a producer unit process and supplying thus stored effluent to a user unit process, which is economically and precisely controlled. Yet another object of the present invention is to provide an improved method and apparatus for the temporary storage of effluent from a producer unit process and the supply of thus stored effluent to a user unit process, which reduces losses of heat energy and reduces energy requirements. These and other objects of the present invention will be apparent from the following description.

The present invention relates to a method and apparatus for temporarily storing producer unit effluent from a first unit process in conjunction with the transmission of the first unit effluent from the first unit to a user unit process, in which all of the effluent from the producer unit process is transmitted directly to the user unit process, as a feed, when the flow rate of the producer unit effluent is essentially equal to a predetermined, operating flow rate for the second unit feed, transmitting excess producer unit effluent through a single flow line to a temporary storage unit, when the flow rate of the producer unit effluent is significantly greater than the predetermined, operating flow rate of the second unit feed, transmitting thus stored producer unit effluent through the single flow line from the temporary storage unit to the user unit process, when the flow rate of the producer unit effluent is significantly below the predetermined, operating flow rate of the feed to the user unit process, monitoring significant variations in the flow rate of the producer unit effluent and selectively controlling the flow of producer unit effluent to and from the temporary storage, as dictated by increases or decreases, respectively, in the output flow rate of the producer unit process. In a preferred embodiment, effluent from the producer unit process is cooled prior to passage to temporary storage and reheated prior to passage to the user unit process by passing the same through a heat adsorbent material, when it is being transmitted from the producer unit to the storage unit, and back through the heat adsorbent material where it is being transmitted from the storage unit to the user unit, preferably through a single flow line.

DESCRIPTION OF THE PREFERRED EMBODIMENTS

When the terms "significantly greater", "significantly less", "significant variations", "significant fluctuations" and like terminology are utilized herein, with reference to the effluent from the producer unit process, this terminology is meant to include such variations or fluctuations which are sufficient to lower the efficiency of or disrupt the operation of the user unit process.

When reference is made to "a single flow line" from the producer unit effluent transmission line to the temporary storage unit, this terminology is meant to include a single, bidirectional flow line spanning the entire distance between the producer unit effluent line and the storage unit with single direction flow lines being provided only as necessary and in such lengths as are necessary to provide separate input and output lines for the storage unit and to accommodate cooling and heating equipment and instrumentation.

The method and apparatus of the present application will be best understood by the following description when read in conjunction with the drawings.

Figure 1:
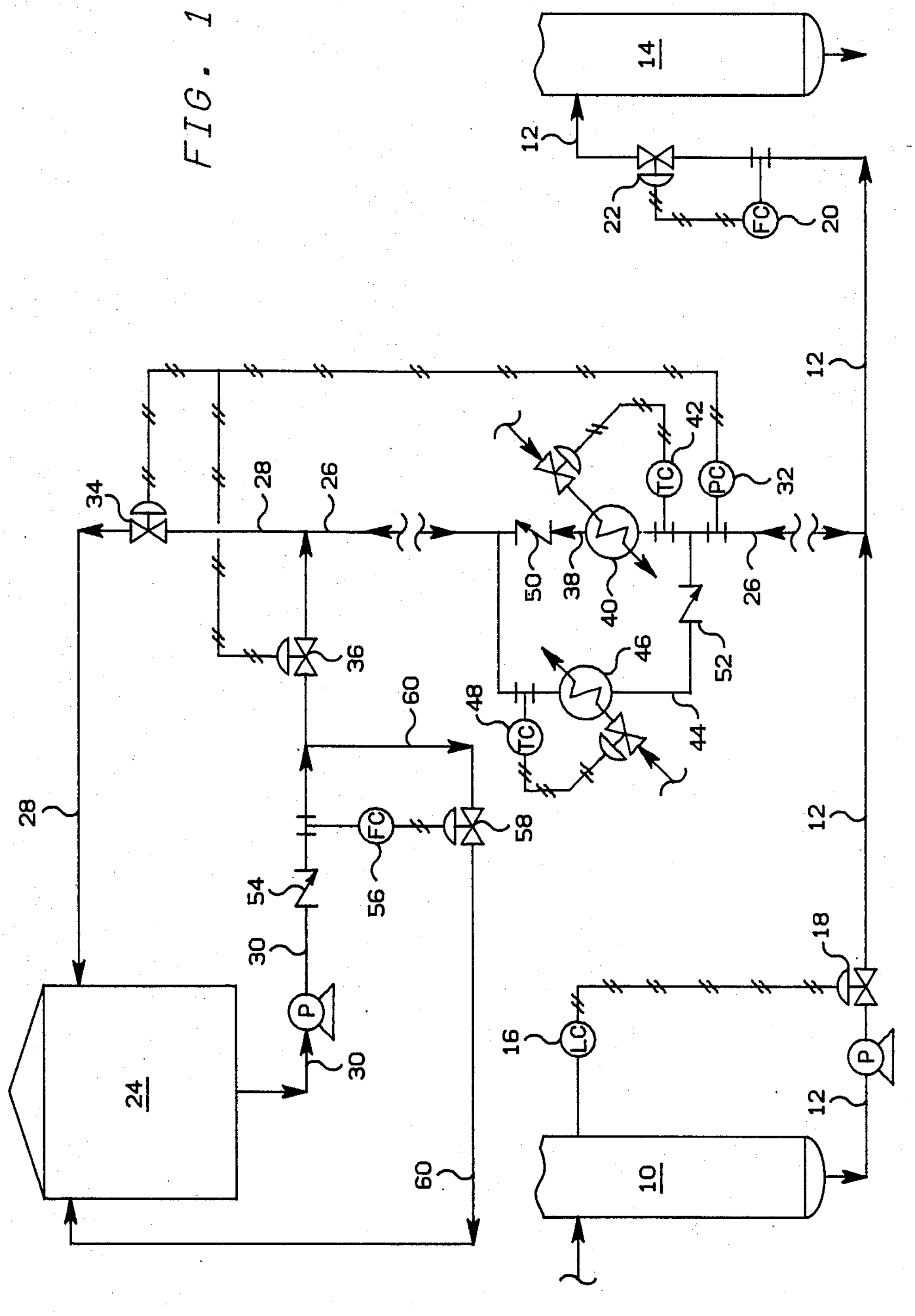
FIG. 1 of the drawings is a schematic flow diagram of one embodiment of the present invention.

FIG. 1 of the drawings illustrates one embodiment of the present invention. In FIG. 1 the numeral 10 represents a producer unit, adapted to produce an effluent stream from a producer unit process. The effluent from unit 10 is pumped through line 12 to user unit 14, representing a user unit process, in which the effluent from unit 10 provides at least one of the feed materials for unit 14. Producer unit process 10 and user unit process 14 can comprise any one of a wide variety of combinations where the effluent from the producer unit process is to be utilized as a feed in the user unit process. For example, units 10 and 14 may be a unit for producing crude naphtha and a platformer unit, respectively, a crude oil separation unit and a distillate hydrodesulfurization unit, respectively, a crude oil separation unit and a heavy oil desulfurization unit, respectively, a crude oil separation unit and a catalytic cracking unit, respectively, a first fractionating unit and a second fractionating unit, respectively, in a natural gas liquids production unit or a gasoline plant, a first fractionation unit and a second fractionation unit, respectively, in a chemical process plant and the like, in, for example, the oil refining industry. If unit 10 is, for example, a unit in which a predetermined liquid level is to be maintained, an appropriate liquid level controller 16, operatively connected to a control valve 18, for example, a diaphram-type motor valve, would be utilized to control the operation of unit 10 to maintain the desired liquid level. Since the feed flow rate to unit 14 is to be maintained substantially constant, this unit would be provided with flow control means 20 adapted to operate control valve 22, and thus maintain a constant feed rate to unit 14, irrespective of variations in the output of unit 10. Since the proper operation of producer unit process 10 will normally result in variations of the effluent output of unit 10 being above and below the predetermined, constant feed rate to user unit process 14, it is necessary to provide a temporary storage unit, such as storage unit 24, for temporarily storing excess effluent from unit 10 and, thereafter, supplying producer unit effluent to user unit process 14, when the output of producer unit 10 is below the predetermined, constant feed rate to user unit process 14. Contrary to conventional practice, a single, bidirectional flow line 26, rather than two single direction flow lines, is provided to transmit producer unit effluent to and from temporary storage unit 24. Bidirectional flow line 26 is utilized to span substantially the entire distance, which may be as long as a mile, between flow line 12 and storage unit 24 with only sufficient additional lines being those required to provide an input line 28 and an output line 30 to and from, respectively, storage unit 24 and to accommodate cooling and heating equipment hereinafter referred to. Utilization of bidirectional flow line 26 substantially reduces the cost of installation and maintenance, particularly where the flow line must be constructed of expensive, specialized materials. In addition to such savings in construction and maintenance, the utilization of bidirectional flow line 26 greatly simplifies the system for controlling flow to and from storage unit 24 by reducing duplicative and unnecessary controls required when two separate flow lines are utilized. Specifically, in accordance with the present invention, when the flow of producer unit effluent through line 12 exceeds the predetermined, constant flow rate required by unit 14, maintained by flow control means 20, the pressure within bidirectional flow line 26 will increase and, when the flow rate of producer unit effluent is below the flow rate required for the feed to unit 14, the pressure in bidirectional flow line 26 will decrease. Accordingly, such fluctuations can be conveniently measured by measuring the pressure within bidirectional flow line 26 and utilizing the thus measured pressure in pressure control means 32 to control the flow of producer unit effluent to and from storage unit 24. For this purpose, pressure control means 32 operates diaphram-type motor valve 34 in the input line 28 to storage unit 24 and diaphram-type motor valve 36 in output line 30 from storage unit 24. Pressure control means 32 may be any appropriate liquid, gas or electronically operated pressure control means. In accordance with the present invention, pressure control means 32 is a split range control means adapted to operate at predetermined low and high measured fluid flow pressures. For example, valves 34 and 36 would normally be closed. At a low detected pressure, valve 36 would be opened to transmit producer unit effluent from storage unit 24 to user unit process 14 while valve 34 would remain closed. At a high detected pressure, representing a flow rate from producer unit process 10 in excess of that required as a feed rate to user unit process 14, valve 34 would open and valve 36 would close.

As pointed out in the introductory portion hereof, where the producer unit effluent is at an elevated temperature, it is necessary to cool excess effluent from producer unit process 10 prior to storing the same in storage unit 24. Such cooling may be carried out at any point and in several alternative modes. In a preferred embodiment, single directional line 38 would be provided to route producer unit effluent through cooling means 40, whose cooling fluid flow is controlled by temperature controller 42, and back to bidirectional line 26. When stored, cool effluent is to be supplied to user unit 14 from storage unit 24, the effluent is passed through single directional line 44, through heating means 46, whose heating fluid flow is controlled by temperature controller 48, and then back to bidirectional line 26. In order to assure that all hot fluid passes through the cooler 40 and all cool fluid passes through heater 46, check valves 50 and 52 may be provided in lines 38 and 44, respectively.

Since producer unit effluent, when required by user unit process 14, will be pumped from storage unit 24, the pump should be appropriately protected. Such protection can include an appropriate check valve 54 in line 30. However, the system is preferably operated to maintain a minimum flow rate through the pump at all times. This can be accomplished by measuring the flow rate through line 30, downstream of the pump, and utilizing the thus measured flow rate in flow controller means 56. Flow controller means 56 would, in turn, operate valve 58 so as to continuously circulate a minimum amount of producer unit effluent through line 30 thence through the pump in line 30 and through bypass line 60 to storage unit 24. Bypass line 60, include valve 58, could also be located between lines 30 and 28.

The embodiment described up to this point, with reference to FIG. 1, serves to reduce initial construction costs, including piping and instrumentation, and to greatly simplify piping and control systems when compared with the conventional dual flow line system. However, it is obvious that the embodiment of FIG. 1 results in substantial losses of energy due to the necessity of cooling the producer unit effluent to the storage unit, is still subject to serious problems of upsets in the operation of user unit 14 and loss of capacity of user unit 14, which result from suddenly and intermittently charging the thus cooled fluid from storage unit 24 to user unit 14, when the cool, stored effluent is not reheated, and requires substantial energy to reheat the fluid, when reheating is practiced.

Figure 2:
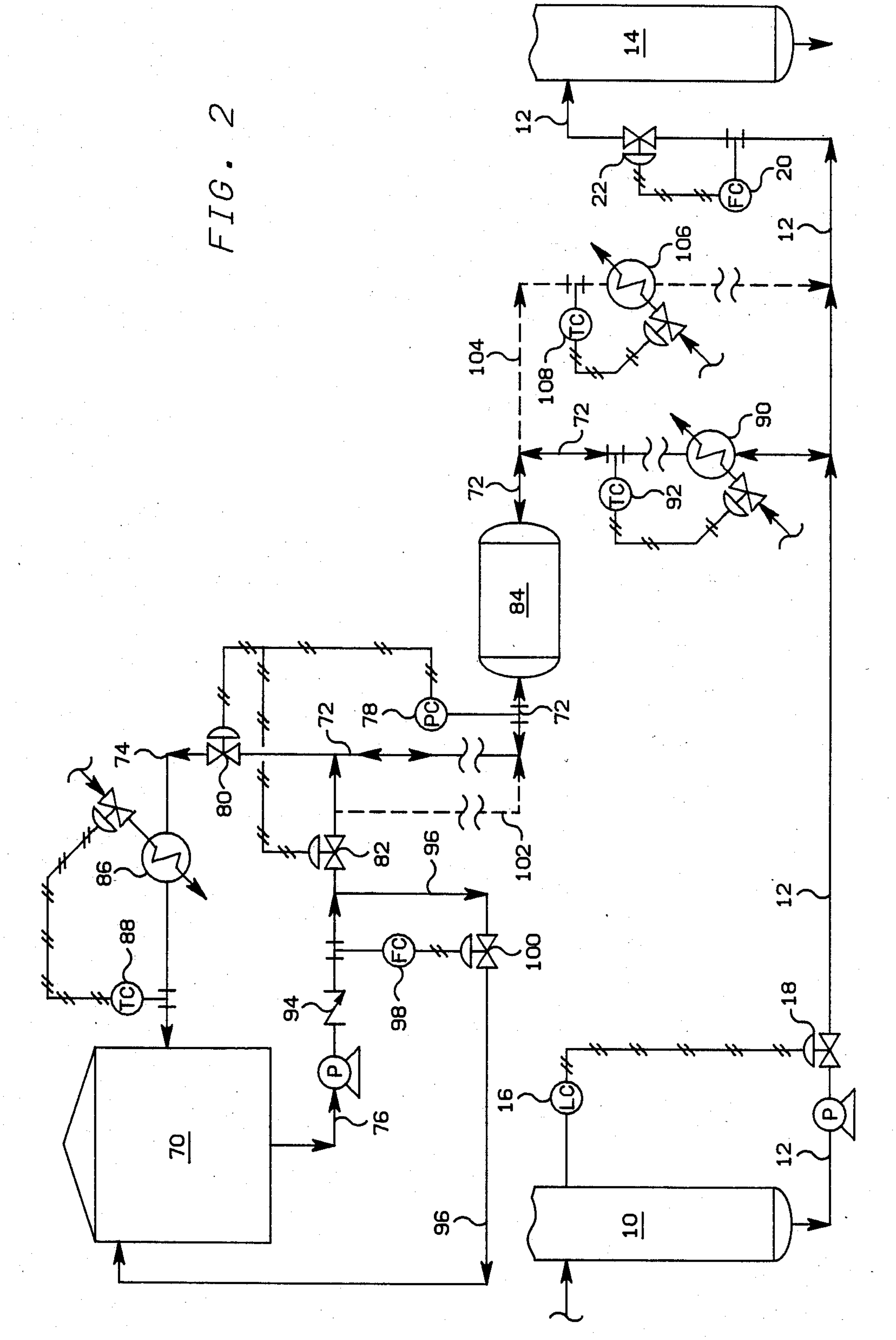
FIG. 2 is a schematic flow diagram of other embodiments of the present invention.

The above-mentioned remaining problems are substantially reduced and/or eliminated by the embodiment illustrated in FIG. 2 of the drawings. It is to be recognized that the embodiment of FIG. 2 can accomplish its intended results utilizing a conventional dual flow system, as shown and described alternatively. However, it is most conventional and preferable to utilize a single, bidirectional flow line in the embodiment of FIG. 2 and accomplish the improved results and advantages of both the embodiment of FIG. 1 and the embodiment of FIG. 2.

In accordance with FIG. 2, producer unit 10 discharges its effluent through line 12 and is pumped to user unit 14, as in the previous embodiment. Direct flow of all of the effluent from producer unit 10 to user unit 14 occurs when the flow rate of effluent from producer unit 10 is substantially equal to the predetermined, constant feed rate required by user unit 14. The liquid level in producer unit 10 is controlled by level controller 16 which operates control valve 18. The flow rate to user unit 14 is controlled by flow controller 20 which operates control valve 22. Effluent from producer unit 10 is passed to storage unit 70 through bidirectional flow line 72 and thence through one way flow line 74. User unit effluent from storage unit 70 is passed through one way flow line 76 and thence pumped into bidirectional flow line 72 to line 12 and user unit 14. As previously indicated with reference to FIG. 1, when the flow rate of effluent from producer unit 10 exceeds a predetermined feed rate to user unit 14, it is necessary to store the excess effluent in storage unit 70 and, when the effluent flow rate for producer unit 10 falls below the minimum feed rate required by user unit 14, effluent is withdrawn from storage to make up this deficiency by pumping effluent through lines 76, 72 and 12 to unit 14. Since the operation of flow controller 20 and valve 22 causes a pressure build up in line 72 when the effluent from producer unit 10 exceeds the predetermined feed rate to user unit 14 and the pressure in line 72 drops when the effluent rate from producer unit 10 is lower than the predetermined feed rate to user unit 14, flow to and from storage unit 70 through bidirectional flow line 72 can be controlled by measuring the pressure in bidirectional line 72 and producing a signal by means of pressure controller 78 which operates diaphram motor valves 80 and 82. When the effluent rate from producer unit 10 exceeds the predetermined feed rate to user unit 14, and thus the pressure builds up in line 72, pressure controller 78 will open valve 80 and close valve 82, thereby causing producer unit 10 effluent to flow through bidirectional flow line 72, thence through line 74 and to storage unit 70. When the effluent flow rate from producer unit 10 is below the predetermined feed rate to user unit 14 and the pressure in line 72 drops, pressure controller 78 closes valve 80 and opens valve 82, thereby supplying the deficiency from storage unit 70 through line 76, thence through bidirectional flow line 72 and line 12 to user unit 14.

In accordance with the present embodiment, heat adsorbent unit 84 is mounted in bidirectional flow line 72. Heat adsorbent unit 84 may be a horizontal or vertical tank or simply piping loaded with an inert heat adsorbing material, which, of course, would be selected dependent upon the fluids flowing through bidirectional flow line 72. The heat adsorbent material in heat adsorbing unit 84 can be any adsorbent material which will adsorb heat from a hot fluid and retain it for a significant amount of time and will, thereafter, give up such heat to a cooler fluid flowed therethrough. For example, scrap steel, gravel, sand, etc. may be utilized depending upon whether it is inert to the fluids flowing therethrough. Heat adsorbing unit 84 adsorbs heat until it reaches the temperature of the effluent, thus eliminating a substantial amount of the cooling which is normally necessary to cool hot fluid from producer unit 10 prior to storage in storage unit 70. By the same token, the adsorbent releases the heat until it reaches the stored fluid temperature and the heat thus adsorbed can be recovered when fluid from storage unit 70 is passed through heat adsorbing unit 84 to user unit 14. Utilization of heat adsorbing unit 84 as an adjunct to a conventional cooler has a number of distinct advantages. A substantial amount of the heat from fluids from producer unit 10, which are to be stored, is removed, while at the same time making the adsorbed heat in unit 84 available for the effluent to be withdrawn from storage unit 70 and passed to user unit 14. Since the effluent from producer unit 10 varies considerably and often, due to upsets, normal fluctuations in flow, etc., fluid will be cycling through head adsorbing unit frequently and all day. Thus, substantial savings in heat energy are accomplished. Heat adsorbing unit 84 also results in smoother and more profitable operation of user unit 14, by helping to hold the heat balance constant and at an optimum feed temperature. The capacity of user unit 14 will also be improved since user unit 14 will normally lose capacity if the feed temperature drops below design temperature. Obviously also, heat adsorbing unit 84 reduces upsets in the operation of user unit 14.

While the amount and character of adsorbent material in heat adsorbing unit 84 can be selected to remove substantial amounts of the heat from the excess effluent from producer unit 10, all of the heat cannot be removed and completely accurate control of the amount of heat removed is not possible. Accordingly, cooling unit 86 is mounted in line 74 in order to remove any excess heat necessary to permit storage of the effluent in storage unit 70. Cooler 86 is operated by temperature controller 88. Similarly, all of the heat necessary for the operation of user unit 14 cannot be supplied by adsorbing unit 84 and accurate control of the amount of heat supplied is not possible. Thus, heating unit 90 is mounted in line 72 to provide any additional heat necessary to permit operation of user unit 14 at essentially its design temperature. Heater 90 is operated by temperature controller 92. The pump utilized in line 76 is partially protected from the backflow of fluid therethrough by check valve 94. However, conventionally, the pump requires a minimum flow therethrough, to prevent damage to the pump. Such continuous flow can be provided by pumping a small amount of effluent from storage unit 70 though bypass line 96 and back to storage unit 70. This minimal flow is maintained by flow controller 98 which operates diaphram motor valve 100.

As previously indicated, heat adsorbing unit 84 can also be utilized when dual flow lines to and from storage unit 70 are utilized. This alternative is shown in dashed lines in FIG. 2. For purposes of illustration of this embodiment, flow line 72 is considered an input line to storage unit 70 and excess effluent from producer unit 10 flows through line 72, heat adsorbing unit 84, thence through lines 72 and 74 to storage unit 70. When thus considering line 72 as a single direction flow line in this manner, heater 90 and temperature controller 92 would be unnecessary. Cool, stored effluent from storage unit 70 would be supplied to user unit 14 by passing the same through line 76, single direction return line 102, heat adsorbing unit 84 and single direction return line 104. It is to be noted that in this embodiment heat adsorbing unit 84 is mounted in a bidirectional portion of line 72 to thus attain the advantages of heat adsorption from excess producer unit 10 effluent as it passes to storage unit 70 and heat release to cool, stored effluent as it is supplied from storage unit 70 to user unit 14. Additional heat necessary to maintain the design temperature of feed to user unit 14 is provided by heating means 106 mounted in line 104 and controlled by temperature controller 108.

While fluid-operated diaphram motor valves are illustrated and described herein, it will be obvious to one skilled in the art that such illustration and description is for convenience. However, the valves could be actuated by electronic signals with movements proportional to milliamp signals produced by temperature controllers, pressure controllers and flow controllers.

The advantage in utilizing a heat adsorbing unit, such as unit 84, has been calculated for a specific example, wherein an atmospheric residium desulphurization unit (ARDS) represents the producer unit and a heavy oil cracking unit (HOC) represents the user unit. In accordance with conventional practice, where a conventional cooler is utilized to cool excess effluent from the ARDS unit for storage, the HOC unit must be operated at least 10% below capacity to allow for sudden changes in feed temperature. If, for some reason, the ARDS unit ceases to function, all of the feed to the HOC unit would suddenly have to come from the storage tank which operates at about 250° F. The HOC feed which originally comes directly from the ARDS unit is normally about 550°–600° F. This drastic and sudden drop in temperature would require a very large increase in catalyst circulation rate at the HOC unit. For this reason, current operations require manipulative operation of valve positions in order to accommodate the condition. The heat adsorbing unit can be designed so that a 15–20-minute time period would be provided in order to lower the HOC feed rate in an orderly fashion. This would eliminate valve manipulation and could increase the feed to the HOC unit to near capacity or by about 10% above conventional levels. If, for example, this 10% increase in the capacity of the HOC unit were 5000 barrels per day, this will translate into a 13,000 barrel per day incremental increase in the charge capacity to the ARDS unit. Thus, the 13,000 barrel per day increase in feed to the ARDS unit, resulting from the 5,000 barrel per day increase in the feed to the HOC unit, would result in an increase in profit of about $13,650,000 dollars per year. In addition, energy savings from storage and recovery of heat in the heat adsorbing unit would be about $225,120.00 per year. Thus, the total savings plus profit would be about $13,875,000 dollars per year.

While specific elements, structures, assemblies, materials and modes of operation have been referred to herein, it is to be understood that such specific references are by way of illustration only and to set forth the best mode of the present invention and, therefore, such specific recitals are not to be considered limiting.

That which is claimed:

1. A method for temporarily storing a producer unit effluent, having a temperature substantially above atmospheric temperature, during the transmission of said producer unit effluent to a user unit, as a user unit feed, at a predetermined user unit temperature, substantially above atmospheric temperature, and a predetermined user unit feed rate, comprising:

(a) transmitting all of said producer unit effluent directly to said user unit, at times when the producer unit effluent flow rate is essentially equal to said predetermined, user unit feed rate;

(b) transmitting a portion of said producer unit effluent to a temporary storage unit, at times when said producer unit effluent flow rate is significantly greater than said predetermined, user unit feed rate, in an amount such that the producer unit effluent flow rate of the remainder of said producer unit effluent is essentially equal to said predetermined, user unit feed rate, and transmitting said remainder of said producer unit effluent directly to said user unit;

(c) transmitting all of said producer unit effluent directly to said user unit, at times when said producer unit effluent flow rate is significantly less than said predetermined, user unit feed rate, and transmitting thus stored producer unit effluent from said storage unit to said user unit, in an amount such that the amount of the producer unit effluent, thus transmitted directly to said user unit, plus the amount of the producer unit effluent, thus transmitted from said storage unit to said user unit, is essentially equal to said predetermined, user unit flow rate;

(d) cooling the producer unit effluent thus transmitted from the producer unit to the storage unit by passing said producer unit effluent through a heat adsorbent material, and heating the producer unit effluent thus transmitted from said storage unit to said user unit by passing said producer unit effluent through said heat adsorbent material; and (e) measuring the temperature of said producer unit effluent, thus transmitted from said producer unit to said storage unit, between said absorbent material and said storage unit and maintaining a predetermined storage unit temperature by further cooling said producer unit effluent, at times when the thus measured temperature is significantly above said predetermined storage unit temperature, to thus maintain said storage unit temperature at essentially said predetermined storage unit temperature.

2. A method in accordance with claim 1 wherein the temperature of the stored producer unit effluent, thus transmitted from the storage unit to the user unit, is measured between the adsorbent material and said user unit and the predetermined temperature of said producer unit effluent fed to said user unit is maintained by further heating said producer unit effluent, at times when the thus measured temperature is significantly below said predetermined user unit feed temperature, to thus maintain said predetermined user unit feed temperature.

3. A method in accordance with claim 1 wherein a function of the producer unit effluent flow rate of the producer unit effluent, thus transmitted directly from the producer unit to the user unit, is measured and producer unit effluent is thus transmitted from the producer unit to the storage unit and from the storage unit to said user unit, at times when the thus measured function of said producer unit effluent flow rate is significantly greater and less, respectively, than the predetermined user unit feed rate.

4. A method in accordance with claim 3 wherein the flow rate of producer unit effluent to the user unit is maintained at essentially the predetermined, user unit feed rate, whereby the function of the producer unit effluent flow rate varies in response to differences in the amount of producer unit effluent produced by said producer unit and the thus controlled amount of producer unit effluent passed to said user unit.

5. A method in accordance with claim 4 wherein the function of the producer unit flow rate thus measured is the pressure of the producer unit effluent thus passed directly from the producer unit to the user unit.

6. A method in accordance with claim 3 wherein the function of the producer unit effluent flow rate thus measured is the pressure of the producer unit effluent thus passed directly from the producer unit to the user unit.

7. A method in accordance with claim 1 wherein the portion of the producer unit effluent, thus transmitted to the temporary storage unit, and the thus stored producer unit effluent, thus transmitted from said storage unit to said user unit, are transmitted through a single bidirectional flow line.

8. A method in accordance with claim 7 wherein a function of the producer unit effluent flow rate of the producer unit effluent, thus transmitted through said bidirectional flow line, is measured in said bidirectional flow line and producer unit effluent is thus transmitted from the producer unit to the storage unit and from said storage unit to said user unit, through said bidirectional flow line, at times when the thus measured function of said producer unit effluent flow rate is significantly greater and less, respectively, than the predetermined user unit feed rate.

9. A method in accordance with claim 8 wherein the flow rate of producer unit effluent to the user unit is maintained at essentially the predetermined, user unit feed rate, whereby the function of producer unit effluent flow rate in the bidirectional flow line varies in response to differences between the amount of producer unit effluent produced by said producer unit and the thus controlled amount of producer unit effluent passed to said user unit.

10. A method in accordance with claim 9 wherein the function of the producer unit effluent flow rate thus measured is the pressure of the producer unit effluent in the bidirectional flow line.

11. A method in accordance with claim 8 wherein the function of the producer unit effluent flow rate thus measured is the pressure of the producer unit effluent in the bidirectional flow line.

* * * * *